(12) United States Patent
Muser et al.

(10) Patent No.: US 8,095,229 B2
(45) Date of Patent: Jan. 10, 2012

(54) THREE-DIMENSIONAL (3D) MANUFACTURING PROCESS PLANNING

(75) Inventors: Marino Muser, Rochester Hills, MI (US); Pascal Lecland, West Bloomfield, MI (US); Albert Wang, Rochester Hills, MI (US); Patrick Merlat, Suresnes (FR)

(73) Assignee: Dassault Systemes DELMIA Corp., Auburn Hills, MI (US)

( * ) Notice: Subject to any disclaimer, the term of this patent is extended or adjusted under 35 U.S.C. 154(b) by 443 days.

(21) Appl. No.: 12/330,261

(22) Filed: Dec. 8, 2008

(65) Prior Publication Data
US 2010/0145490 A1  Jun. 10, 2010

(51) Int. Cl.
*G06F 19/00* (2006.01)
(52) U.S. Cl. ............................................ 700/96; 700/82
(58) Field of Classification Search .............. 700/96–98, 700/82, 117, 197, 103; 703/2
See application file for complete search history.

(56) References Cited

U.S. PATENT DOCUMENTS

| | | | |
|---|---|---|---|
| 6,324,438 B1* | 11/2001 | Cormier et al. | 700/118 |
| 7,016,821 B2* | 3/2006 | Rameau et al. | 703/2 |
| 7,733,339 B2* | 6/2010 | Laning et al. | 345/420 |
| 2002/0072820 A1* | 6/2002 | Thackston | 700/97 |
| 2002/0183877 A1* | 12/2002 | Rameau et al. | 700/98 |
| 2009/0030661 A1 | 1/2009 | Bouffiou et al. | |

* cited by examiner

*Primary Examiner* — Kidest Bahta
(74) *Attorney, Agent, or Firm* — Hamilton, Brook, Smith & Reynolds, P.C.

(57) ABSTRACT

Manufacturing process planning is usually considered as not intuitive for non-expert user. This is because a user needs to deal with processes, describing a work to be done, and other abstract concepts that are loosely related to the real world. Accordingly, a method and corresponding apparatus according to an embodiment of the present invention are provided to describe a work to be done in response to a user interacting with a three-dimensional representation of one or more parts that form a product and to provide the user with feedback in the form of a graphical representation of the work to be done. This approach is very intuitive as it is close to how a user would, for example, in a real world, decompose a product into sub-assemblies that essentially results into a definition of a manufacturing process of the product.

17 Claims, 14 Drawing Sheets

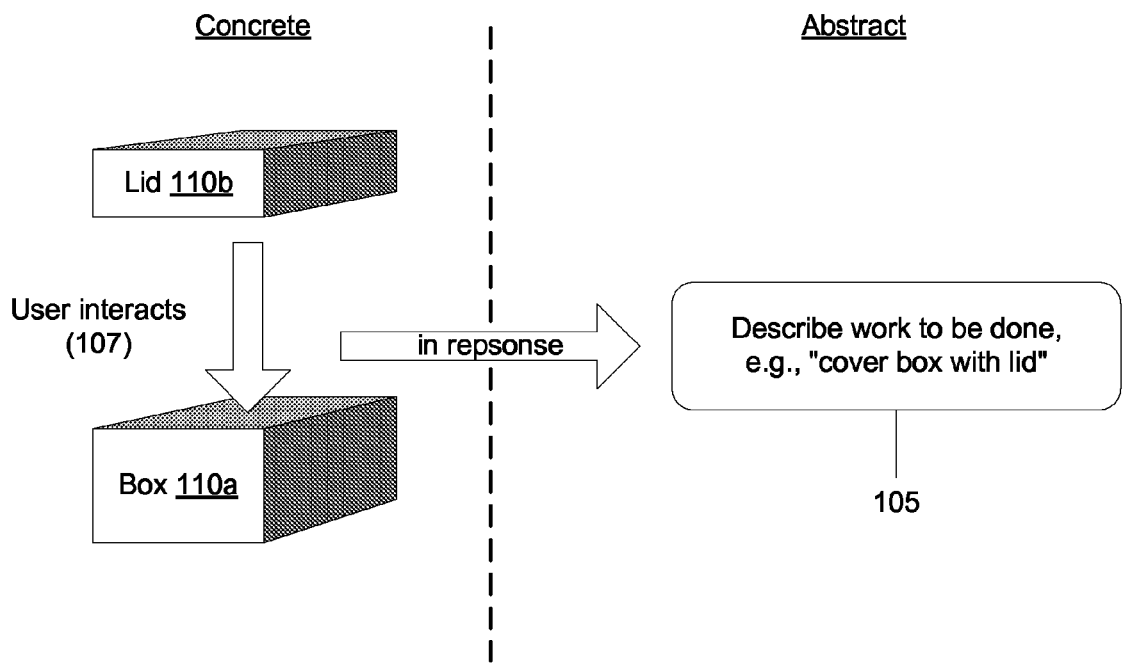
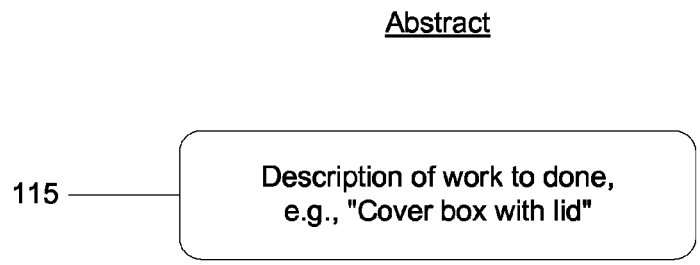
FIG. 1

THREE-DIMENSIONAL (3D) MANUFACTURING PROCESS PLANNING

BACKGROUND OF THE INVENTION

A manufacturing process is a description of work to be done to manufacture a product. Manufacturing process planning involves describing and generating a description of the work to be done to manufacture the product. A manufacturing process engineer is tasked with such describing and generating of the description of the work to be done to manufacture the product.

SUMMARY OF THE INVENTION

An example embodiment of the present invention may be implemented in the form of a method or corresponding apparatus for defining a manufacturing process. The method and corresponding apparatus according to one embodiment of the present invention includes, given a manufactured product formed of one or more parts, for each user interaction, describing (e.g., generating graphical-type description of) a work to be done in response to a user interacting with a three-dimensional representation of the one or more parts, and providing the user with feedback of the describing in the form of a graphical representation of the work to be done. The manufacturing process is defined by the graphical representation of the work to be done.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 1 is a block diagram contrasting embodiments of the present invention with other solutions;

DETAILED DESCRIPTION OF THE INVENTION

Figure 2A:
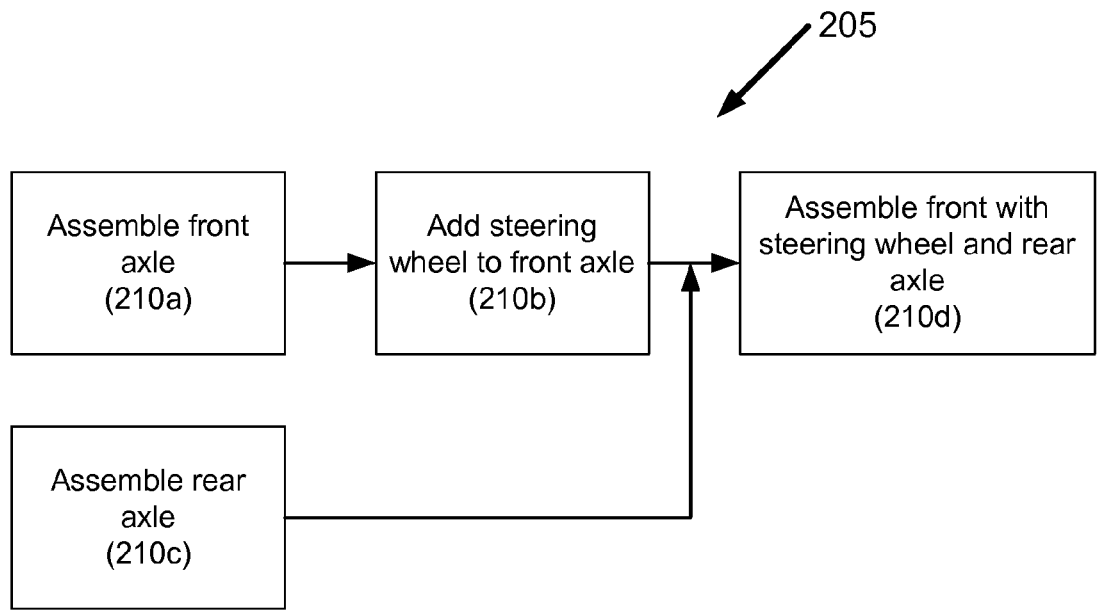
FIGS. 2A-2B are block diagrams of an other solution in the art describing a work to be done with a description of the work to be done.

A description of example embodiments of the invention follows.

Embodiments of the present invention describe a work to be done to manufacture a product in response to a user, such as a manufacturing process engineer, interacting with a three-dimensional representation of one or more parts that form the product. Contrasted with embodiments of the present invention are other solutions that describe a work to be done with a description of the work to be done. To highlight differences in describing a work to be done in a manner according to embodiments of the present invention, consider an example of describing a work to be done to manufacture a lidded box from a lid and a box.

FIG. 1 compares embodiments of the present invention describing a work to be done with other solutions describing a work to be done. Embodiments of the present invention describe a work to be done in response to a user interacting with a three-dimensional representation of parts that form a product. For example in FIG. 1, an embodiment describes the work to be done 105 in response to the user covering (denoted by arrow 107) a three-dimensional representation of a box 110a with a three-dimensional representation of a lid 110b. In contrast to embodiments of the present invention, other solutions describe a work to be done merely with a textual description of the work to be done, such as "cover a box with a lid" 115 stripped of any graphical illustration or visual guidance/feedback.

Describing a work to be done in response to a user interacting with a three-dimensional representation of one or more parts is concrete and intuitive, especially to a user unfamiliar with or new to manufacturing process planning. Describing a work to be done is abstract in nature and a text-only description of the work to be done is a somewhat abstract view of the work to be done. Interacting with a three-dimensional representation of parts, on the other hand, is concrete in nature. A user interacts (via a graphical user interface for example) with a three-dimensional representation of parts much as the user would interact with physical objects in the real world.

With embodiments of the present invention, a user interacts with a three-dimensional representation of parts (concrete), and in response, the embodiments graphically describe a work (with visual cues) to be done (abstract or conceptual). Embodiments of the present invention enable a manufacturing process for manufacturing a product to be defined (abstract) by a user graphically interacting with or otherwise manipulating a three-dimensional representation of parts that form the product (concrete). This approach to working with manufacturing processes is very intuitive because it is close to how in the real world a user would, for example, decompose or otherwise breakdown a manufactured product into sub-assemblies that essentially result into a definition of a manufacturing process to manufacture the product.

In contrast, with other solutions describing a work to be done with a largely text-only description of the work to be done is abstract and less intuitive. There a user needs to deal with manufacturing processes, describing (in text terms only) of a work to be done, and other abstract concepts that are loosely related to the real world.

FIG. 1 further illustrates that with other solutions describing a work to be done with a text-only description of the work to be done, there is a need to validate the description to check or otherwise verify that an outcome of the work to be done, as described by the description, is as intended. For example in FIG. 1, the text-only description of the work to be done "cover a box with a lid" 115 may or may not result in the intended lidded box. As such, the description 115 needs to be validated. Not knowing and having to verify an outcome of a work to be done, as described by a text-only description, compounds the abstract and less intuitive nature of other solutions describing work to be done with a description of the work to be done.

In contrast, when a user graphically interacts with a three-dimensional representation of one or more parts to affect an outcome, there is, as an output/outcome a manifestation or evidence of the user's intent. For example in FIG. 1, an intended outcome is the user covering (denoted by arrow 107) the three-dimensional representation of the box 110a with the three-dimensional representation of the lid 110b. Because embodiments of the present invention describe with visual graphics (and not solely or mainly text) a work to be done in response to or otherwise based on a user graphically interacting with a three-dimensional representation of one or more parts, that is, a visual view/illustrative demonstration of the intended outcome, there is no need to validate the work to be done as described by the embodiments. As FIG. 1 illustrates, with embodiments of the present invention an outcome is illustrated/graphically generated or otherwise results first (before any text description) and the outcome dictates describing a work to be done.

Figure 2B:
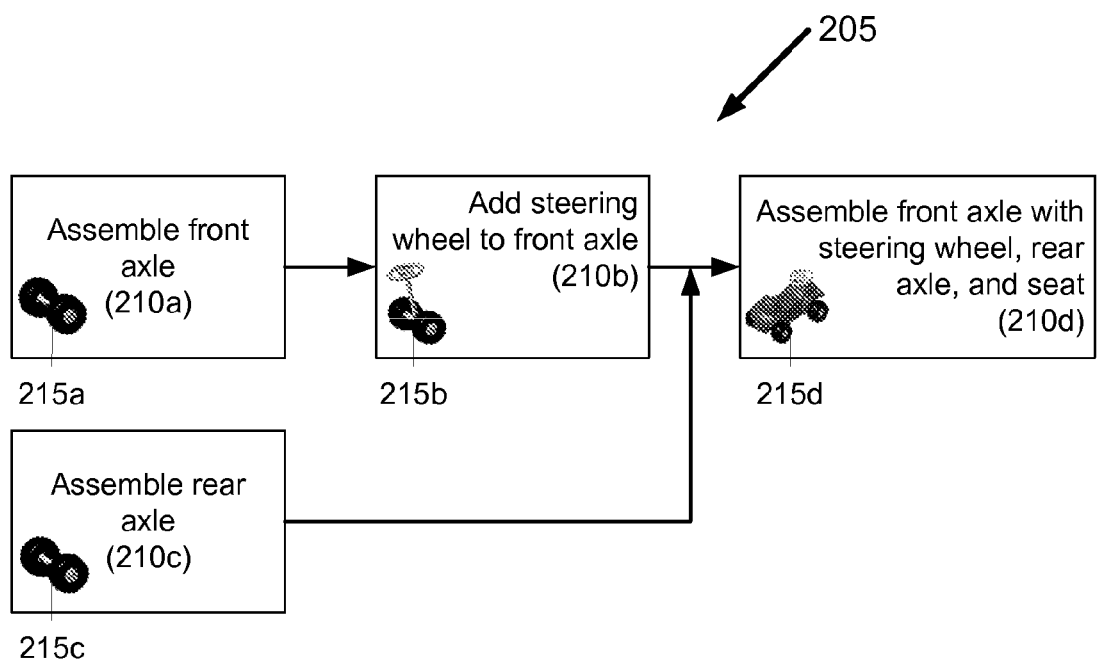

FIGS. 2A and 2B illustrate other solutions in the art for defining a manufacturing process. With other solutions, manufacturing process planning is usually considered to be composed of three major steps: i) defining a manufacturing process, ii) associating a three-dimensional representation of parts (also referred to as geometry) to the manufacturing process, and iii) assigning the manufacturing process to resource(s). In the first step of defining a manufacturing process, a user, such as a manufacturing process engineer, describes steps to be executed, i.e., work to be done, to manufacture a product. In FIG. 2A, a flow diagram representation of the manufacturing process 205 represents the manufacturing process sequence of steps/course of work to be done (stripped of 3D illustrative demonstration). The user describes the work to be done with text-only descriptions of the work to be done: "assemble front axle" 210a, "add steering wheel to front axle" 210b, "assemble rear axle" 210c, and "assemble front axle with steering wheel, rear axle, and seat" 210d.

In the first step of defining the manufacturing process, the user uses a two-dimensional (2D) editor. Next, in the second step of associating geometry to the manufacturing process, the user associates a front axle geometry 215a, front axle and steering wheel geometry 215b, rear axle geometry 215c, and front axle, rear axle, steering wheel, and seat geometry 215d to the respective text descriptions of the work to be done 210a-d. Finally, in the third step of assigning the manufacturing process to resource(s), the user assigns which resource (e.g., a machine or human) will perform the work to be done described by the descriptions of the work to be done 210a-d.

These other solutions illustrated in FIGS. 2A-2B, however, have technical problems and deficiencies. For example, the first step of defining a manufacturing process and the second step of associating a three-dimensional representation of parts to the manufacturing process are not necessarily done by the user completely sequentially. The user, however, must work with an abstract view of the manufacturing process (viz., the text-based flow diagram representation of the manufacturing process 205 of FIG. 2A) using a two-dimensional editor. This is not intuitive. Even after the three-dimensional representation of the parts 215a-d are assigned to the manufacturing process (FIG. 2B), the mainly text (flow diagram) representation of the manufacturing process 205 still remains two-dimensional. The user runs a process verification utility or other utility to create a three-dimensional graphical representation of the manufacturing process to well understand what the manufacturing process does.

Embodiments of the present invention address these and other technical problems and deficiencies as described below.

Figure 3A:
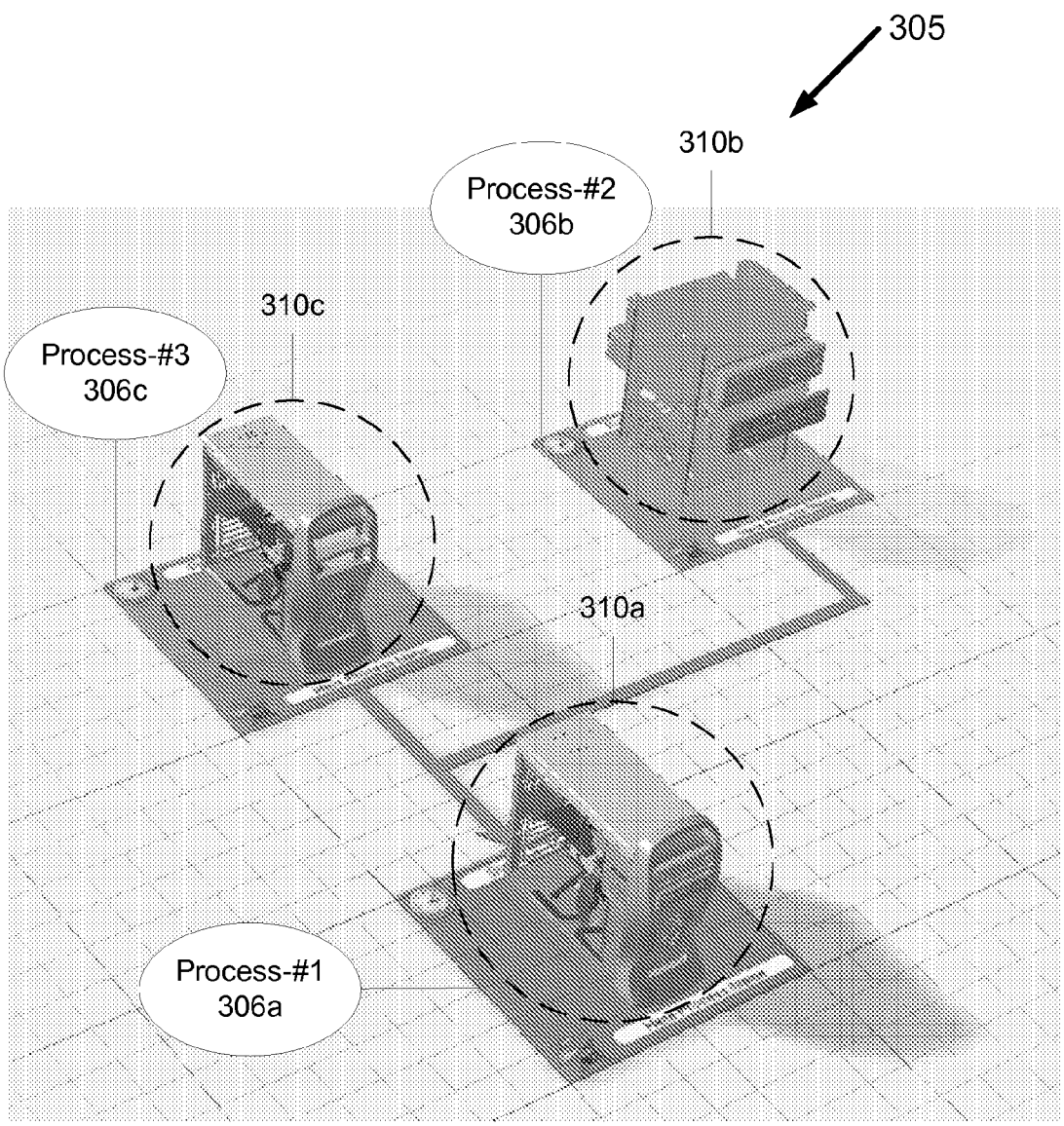
FIGS. 3A-3C are screenshots of defining a manufacturing process, in accordance with an embodiment of the present invention.
Figure 3B:
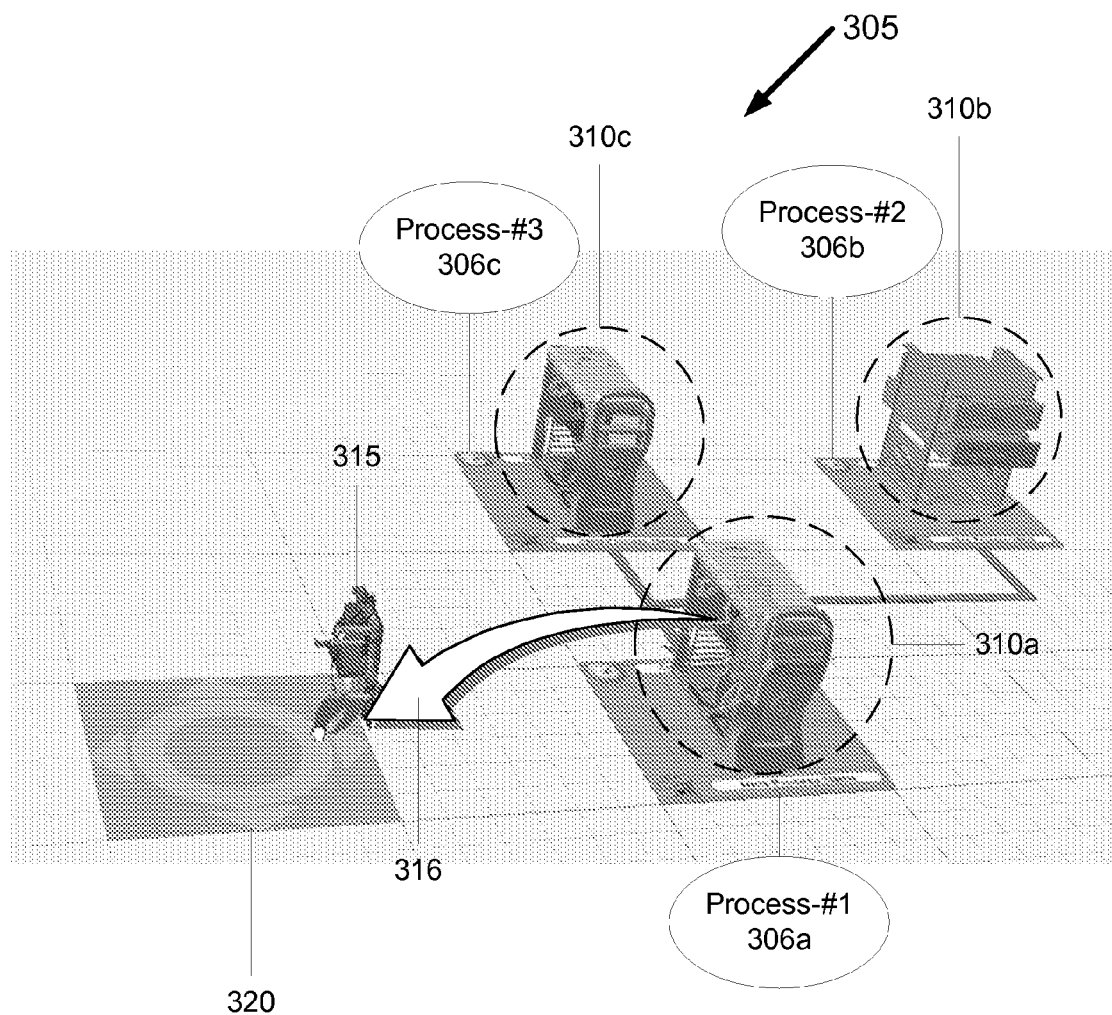
Figure 3C:
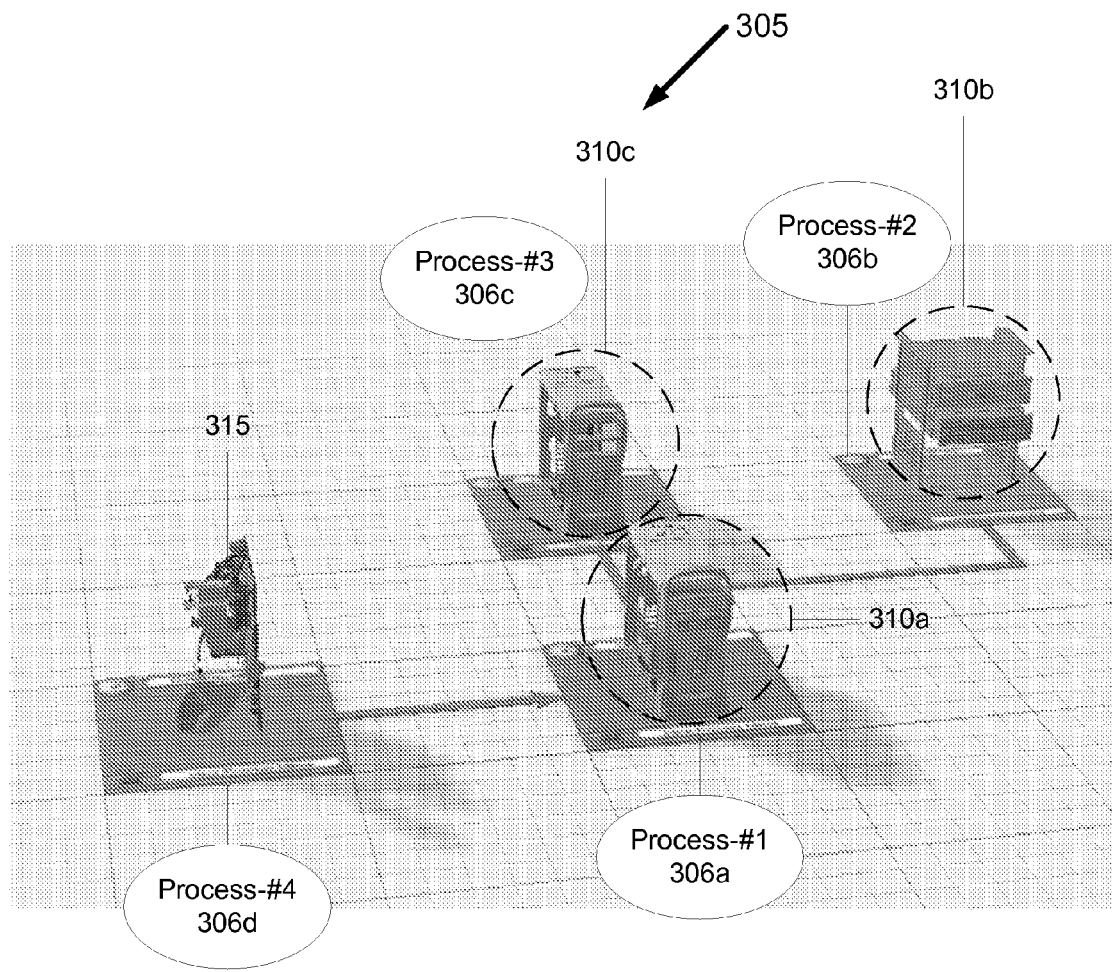

FIGS. 3A-C illustrate an embodiment of the present invention for defining a manufacturing process, such as manufacturing a personal computer (PC). A manufactured product like a PC is formed or otherwise manufactured from one or more parts, e.g., case, power supply, motherboard, central processing unit, drive, etc.

The embodiment of FIGS. 3A-C may be described as follows. A manufacturing process is represented in three-dimensions as a user-interactive graphical representation of the manufacturing process 305. In the example illustrated in FIGS. 3A-C, the manufacturing process represented is an "assembly" process.

In FIG. 3A, process number-1 306a is a final process that assembles outputs of process number-2 306b and process number-3 306c. It may be convenient to think of these processes 306a, 306b, and 306c as sub-processes of the manufacturing process 305. Each sub-process 306a, 306b, and 306c is represented by a three-dimensional output to be produced 310a, 310b, and 310c, respectively.

In FIG. 3B, with the embodiment, a user modifies the process number-1 306a by manipulating the three-dimensional output to be produced 310a. User interaction may be by way of known graphical user interface commands and operations. For example, in the case illustrated in FIG. 3B, the user selects a three-dimensional representation of parts 315 from the process number-1 306a. The user drags (moves) the three-dimensional representation of parts 315 and "drops" them (denoted by arrow 316) onto an "empty space" or work area 320. The empty space 320 initially represents an absence of a process as contrasted with the sub-process 306a, 306b, and 306c. It may be convenient to think of the empty space 320 as an "undefined" process or a work to be done that is not yet described.

In FIG. 3C, in response, the embodiment creates process number-4 306d to produce an assembly made up of the three-dimensional representation of parts 315 dropped (user interacted with) previously. The process number-4 306d is an input of the process number-1 306a.

The embodiment of FIGS. 3A-C may also be described as follows. Recall, a manufacturing process is a description of work to be done to manufacture a product. In FIG. 3A, a 3D image-based graphical representation of a manufacturing process 305 represents manufacturing a PC in a user interactive graphical form.

Continuing with FIG. 3B, given a manufactured product formed from one or more parts, for each user interaction, the embodiment describes a work to be done in response to a user interacting with a three-dimensional representation of the one or more parts. In the example illustrated in FIG. 3B, the user interacts with a three-dimensional representation of one or more parts 315 (denoted by an arrow 316).

Finishing with FIG. 3C, the embodiment provides the user with feedback of the describing in the form of a 3D image-based graphical representation of the work to be done 306d. The embodiment defines the manufacturing process by the graphical representation of the work to be done 306d.

Figure 4:
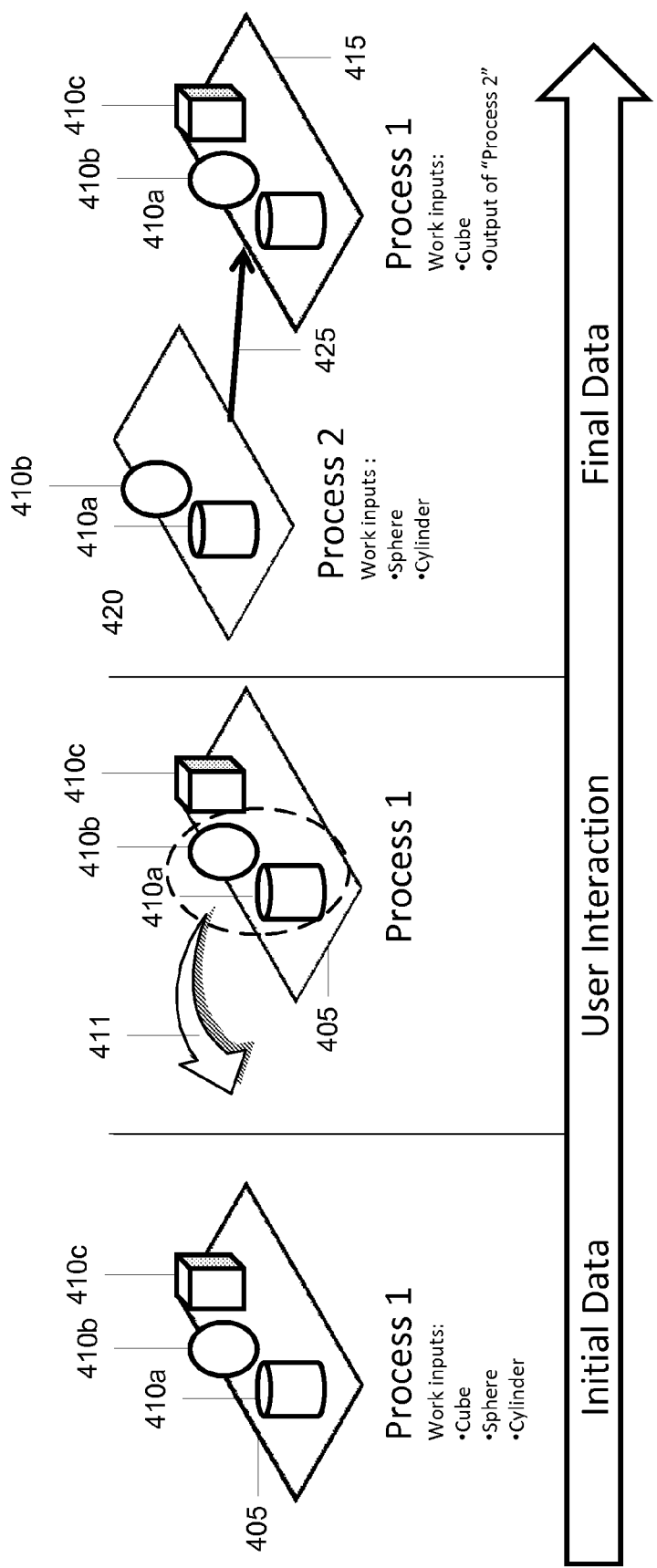
FIGS. 4-7 are block diagrams of describing a work to be done in response to a user interacting with a three-dimensional representation of one or more parts, in accordance with embodiments of the present invention.

FIG. 4 illustrates a convenient embodiment for defining a manufacturing process. A first manufacturing process describes a first unit of work to be done on a first set of work inputs that includes a first part, second part, and third part. A 3D graphical representation of the first unit of work to be done 405 represents the first manufacturing process graphically. A three-dimensional representation of the first part 410a, three-dimensional representation of the second part 410b, and three-dimensional representation of the third part 410c, represent respectively, the first part, second part, and third part of the first set of work inputs graphically.

Given the first manufacturing process described above, in response to a user moving (denoted by arrow 411) the three-dimensional representation of the first part 410a and the three-dimensional representation of the second part 410b from the graphical representation of the first unit of work to be done 405, for example, to an "empty space" the embodiment decomposes the first manufacturing process into a second manufacturing process. An empty space initially represents graphically an absence of a work to be done (i.e., a work to be done not yet described) as contrasted with the graphical representation of the first unit of work to be done 405.

A location of an empty space dictates a location of a graphical representation of a second unit of work to be done described by a second manufacturing process that has been decomposed from a first manufacturing process. In some instances, the location of the empty space indicates where the user intends to locate a graphical representation of a second unit of work to be done.

In other instances, the empty space is located in a hierarchical manner with respect to a graphical representation of a first unit of work to be done (and other graphical representations of other units of work to be done). In these instances, a location of the empty space dictates a hierarchy between the graphical representation of the first unit of work to be done (and other graphical representations of other units of work to be done) and a graphical representation of a second unit of work to be done. For example, a graphical representation of a first unit of work to be done is located at a first hierarchal level and a graphical representation of a second unit of work to be done is located at a second hierarchal level. A relationship between the hierarchal levels may further indicate that an output of a unit of work to be done at one level is an input of another unit of work to be done in a succeeding level (see for example, FIGS. 3A and 3B).

Continuing with FIG. 4, the second manufacturing process describes a second unit of work to be done on a second set of work inputs that includes the first part and the second part, the three-dimensional representations of which the user moved (i.e., the three-dimensional representation of the first part 410a and the three-dimensional representation of the second part 410b). The embodiment updates the first manufacturing process to describe the first unit of work to be done on the first set of work inputs that includes a work output of the second manufacturing process and the third part.

The embodiment provides feedback of the foregoing as a 3D graphical representation of the first unit of work to be done as updated 415 and a 3D graphical representation of the second unit of work to be done 420. A manufacturing process arrow 425 from the graphical representation of the second unit of work to be done 420 to the graphical representation of the first unit of work to be done as updated 415 represents graphically the first set of work inputs on which the first unit of work is to be done includes the work output of the second manufacturing process.

The embodiment defines the manufacturing process by the 3D graphical representation of the first unit of work to be done as updated 415 and the 3D graphical representation of the second unit of work to be done 420.

Using FIG. 4 as an example, initially, a manufacturing process is expressed as a first unit of work done on a first part, second part, and third part. A user moves a three-dimensional representation of the first part and second part from a graphical representation of the first unit of work done. In response, the embodiment decomposes and updates the manufacturing process. Subsequently, the manufacturing process defined by the embodiment is expressed as a second unit of work to be done on the first part and the second part, and the first unit of work to be done on an output of the second unit of work to be done and the third part.

FIG. 4 further illustrates that this embodiment of the present invention for defining a manufacturing process may be conceptualized as: i) given as initial data, a 3D (image-based or other) graphical representation of a first unit of work to be done and three-dimensional representation of parts and ii) in response to a user interaction with the three-dimensional representation of parts, iii) generating as final data, a 3D (image-based or other) graphical representation of the first unit of work to be done as updated and a 3D (image-based or other) graphical representation of a second unit of work to be done. The final data generated defines the manufacturing process.

The embodiment of FIG. 4 illustrates a methodology in which a manufacturing process describes a unit of work to be done initially. Another methodology involves a manufacturing process that does not describe a unit of work to be done initially. Contrasted with the embodiment of FIG. 4, an alternative embodiment for defining a manufacturing process, given a manufacturing process that does not describe a unit of work to be done, in response to a user moving a three-dimensional representation of a first part and a three-dimensional representation of a second part to a graphical representation of the manufacturing process, updates the manufacturing process to describe the unit of work to be done on the first part and the second part. The alternative embodiment provides feedback of the foregoing as a 3D image-based graphical representation (or other 3D representation) of the unit of work to be done on the first part and the second part as updated. The alternative embodiment defines the manufacturing process by the 3D image-based graphical representation (or other 3D representation) of the unit of work to be done as updated.

These embodiments of the present invention contemplate, for example, the following: i) describing work to be done in response to a user "disassembling" a product into one or more parts forming the product and ii) describing work to be done in response to a user "assembling" a product from one or more parts forming the product.

The foregoing demonstrates a flexible nature of embodiments of the present invention. With embodiments of the present invention, a manufacturing process engineer who is tasked with describing a work to be done to manufacture a product thinks about the describing in terms of interacting with a three-dimensional representation of one or more parts that form the product. Additionally, with embodiments of the present invention, the manner in which the manufacturing process engineer interacts with the three-dimensional representation of the one or more parts may accommodate, for example, the way the manufacturing process engineer thinks about the manufacturing process to manufacture the product, or may accommodate the manufacturing process itself.

For example, a manufacturing process engineer may think of a manufacturing process to manufacture a product as taking the product apart. In this case, describing a work to be done for manufacturing the product in response to the user "disassembling" the product (i.e., the user interacts with a three-dimensional representation of one or more parts forming the product in a manner that disassembles the product graphically) accommodates the manufacturing process engineer's way of thinking.

Conversely, a manufacturing process engineer may think of a manufacturing process to manufacture a product as putting the product together. In this case, describing a work to be done for manufacturing the product in response to the user "assembling" the product (i.e., the user interacts with a three-dimensional representation of one or more parts forming the product in a manner that assembles the product graphically) accommodates the manufacturing process engineer's way of thinking.

Such flexibility and the ability to accommodate a manufacturing process engineer's way of thinking are simply not present in other solutions that describe work to be done with a largely text based description of the work to be done.

Figure 5:
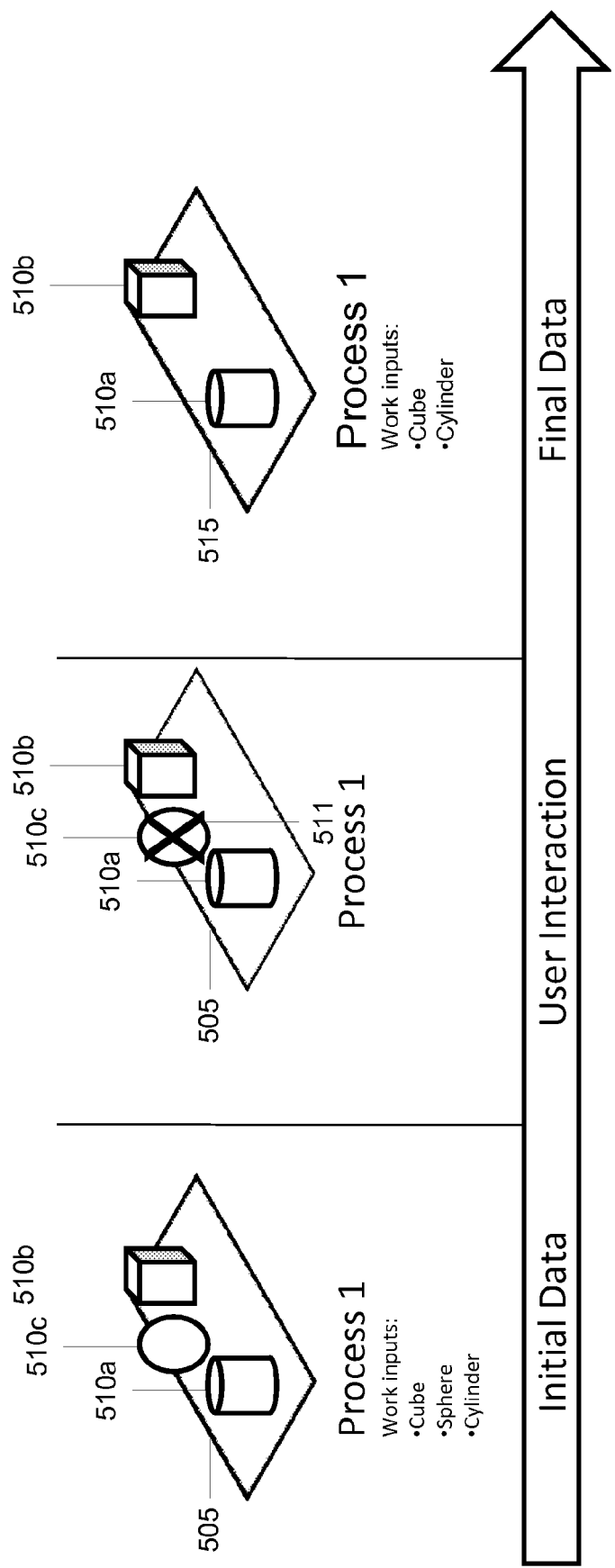

FIG. 5 illustrates another embodiment for defining a manufacturing process. A manufacturing process describes a unit of work to be done on a set of work inputs that includes a first part, second part, and third part. A 3D-based graphical representation of the unit of work to be done 505 represents the manufacturing process graphically. A three-dimensional representation of the first part 510a, three-dimensional representation of the second part 510b, and three-dimensional representation of the third part 510c, represent respectively, the first part, second part, and third part of the set of work inputs graphically.

Given the manufacturing process described above, in response to a user deleting or "un-assigning" the three-dimensional representation of the third part 510c from the graphical representation of the unit of work to be done 505 (denoted by an "X" 511), the embodiment updates the manufacturing process to describe the unit of work to be done on the set of work inputs that includes the first part, the second part, and not the third part, the three-dimensional representations of which the user deleted (i.e., the three-dimensional representation of the third part 510c).

The embodiment provides feedback of the foregoing as a graphical representation of the unit of work to be done as updated 515. The embodiment defines the manufacturing process by the graphical representation of the unit of work to be done as updated 515

Using FIG. 5 as an example, initially, a manufacturing process is expressed as a unit of work done on a first part, second part, and third part. A user un-assigns a three-dimensional representation of a third part from a graphical representation of the unit of work done. In response, the embodiment updates the manufacturing process. Subsequently, the manufacturing process defined by the embodiment is expressed as the unit of work to be done on the first part, the second part, and not the third part.

FIG. 5 further illustrates that this embodiment of the present invention for defining a manufacturing process may be conceptualized as: i) given as initial data, a 3D graphical representation of a unit of work to be done and three-dimensional representation of parts and ii) in response to a user interaction with the three-dimensional representation of parts, iii) generating as final data, a 3D graphical representation of the unit of work to be done as updated. The final data generated defines the manufacturing process.

Figure 6:
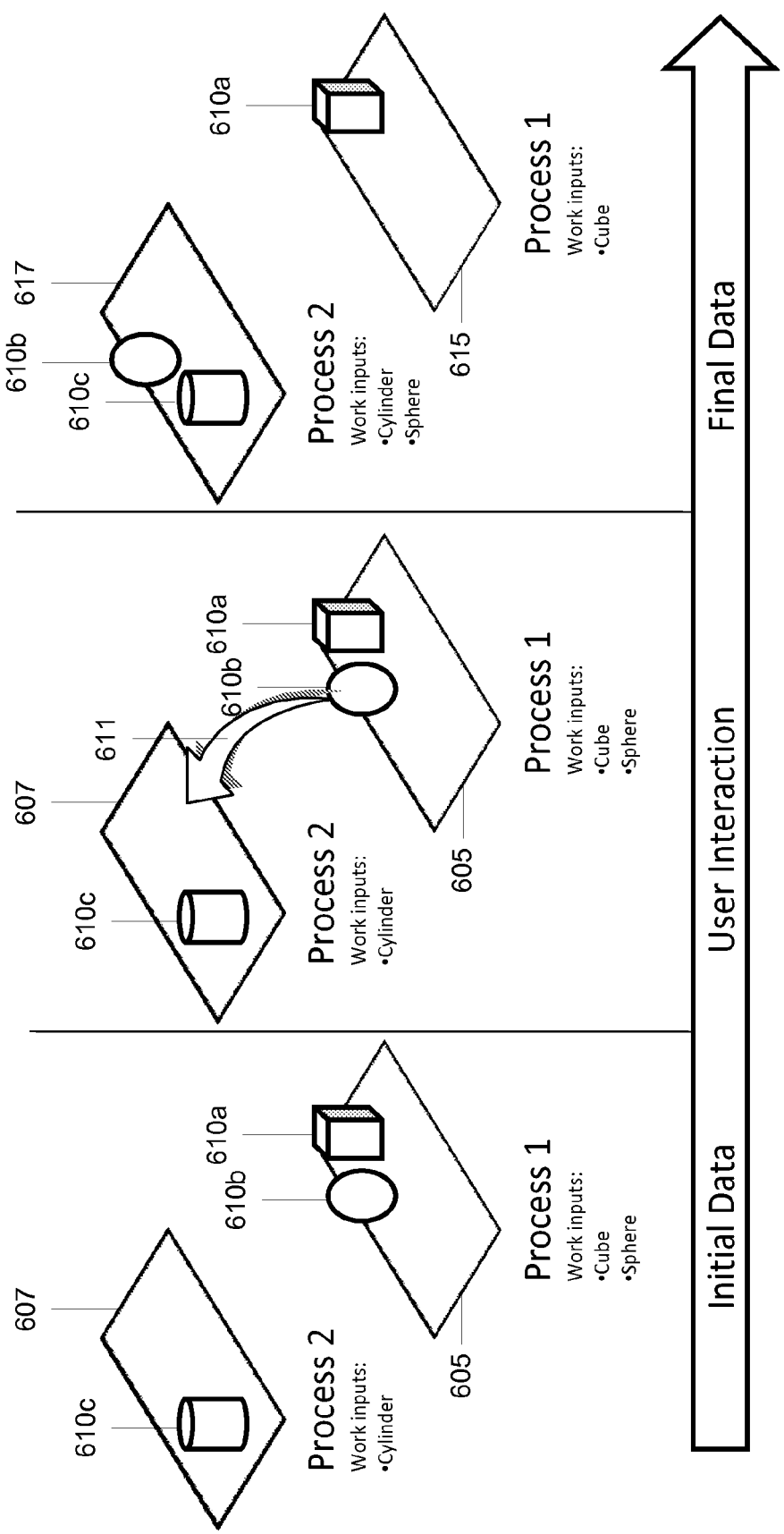

FIG. 6 illustrates yet another embodiment for defining a manufacturing process. A first manufacturing process describes a first unit of work to be done on a first set of work inputs that includes a first part and second part of a manufactured product. A second manufacturing process describes a second unit of work to be done on a second set of work inputs that includes a third part of the manufactured product. A graphical representation of the first unit of work to be done 605 represents the first manufacturing process graphically. A graphical representation of the second unit of work to be done 607 represents the second manufacturing process graphically. A three-dimensional representation of the first part 610a, three-dimensional representation of the second part 610b, and three-dimensional representation of the third part 610c represent respectively, the first part and second part of the first set of work inputs, and the third part of the second set of work inputs graphically.

Given the first manufacturing process and the second manufacturing process described above, in response to a user moving or "re-assigning" the three-dimensional representation of the second part 610b from the graphical representation of the first unit of work to be done 605 to the graphical representation of the second unit of work to be done 607 (denoted by an arrow 611), the embodiment: i) updates the first manufacturing process to describe the first unit of work to be done on the first set of work inputs that includes the first part and not the second part; and ii) updates the second manufacturing process to describe the second unit of work to be done on the second set of work inputs that includes the second part, the three-dimensional representation of which the user moved (i.e., the three-dimensional representation of the second part 610b) and the third part.

The embodiment provides feedback of the foregoing as a 3D graphical representation of the first unit of work to be done as updated 615 and a 3D graphical representation of the second unit of work to be done as updated 617. The embodiment defines the manufacturing process by the graphical representation of the first unit of work to be done as updated 615 and the graphical representation of the second unit of work to be done as updated 617.

Using FIG. 6 as an example, initially, a first manufacturing process is expressed as a first unit of work done on a first part and second part, and a second manufacturing process is expressed as a second unit of work done on a third part. A user re-assigns a three-dimensional representation of the second part from a graphical representation of the first unit of work done to a graphical representation of the second unit of work done. In response, the embodiment updates the first manufacturing process and the second manufacturing process. Subsequently, the first manufacturing process defined by the embodiment is expressed as the first unit of work to be done on the first part and not the second part, and the second manufacturing process defined by the embodiment is expressed as the second unit of work to be done on the second part and third part.

FIG. 6 further illustrates that this embodiment of the present invention for defining a manufacturing process may be conceptualized as: i) given as initial data, a 3D graphical representation of a first unit of work to be done, 3D graphical representation of a second unit of work to be done, and three-dimensional representation of parts, and ii) in response to a user interaction with the three-dimensional representation of parts, iii) generating as final data, a 3D graphical representation of the first unit of work to be done as updated and 3D graphical representation of the second unit of work to be done as updated. The final data generated defines the manufacturing process.

Figure 7:
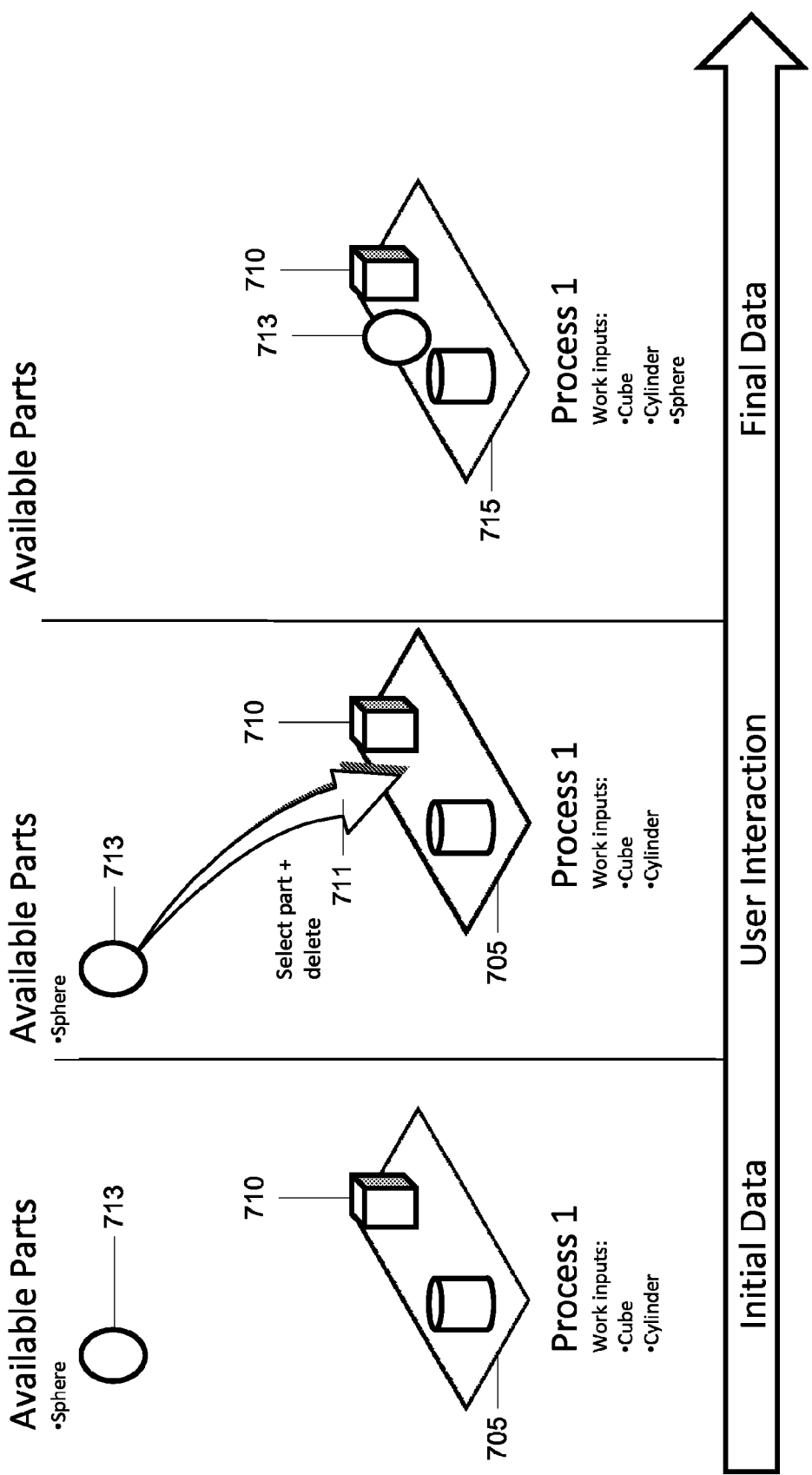

FIG. 7 illustrates still yet another embodiment for defining a manufacturing process. A manufacturing process describes a unit of work to be done on a set of work inputs that includes a first part. A graphical representation of the unit of work to be done 705 represents the manufacturing process graphically. A three-dimensional representation of the first part 710 represents the first part of the set of work inputs graphically.

Given the manufacturing process described above, in response to a user moving or "assigning" a three-dimensional representation of an available part 713 to the graphical representation of the unit of work to be done 705 (denoted by an arrow 711), the embodiment updates the manufacturing process to describe the unit of work to be done on the set of work inputs that includes the first part and the available part, the three-dimensional representation of which the user moved (i.e., the three-dimensional representation of the available part 713).

The embodiment provides feedback of the foregoing as a 3D graphical representation of the unit of work to be done as updated 715. The embodiment defines the manufacturing process by the graphical representation of the unit of work to be done as updated 715

Using FIG. 7 as an example, initially, a manufacturing process is expressed as a unit of work done on a first part. A user assigns a three-dimensional representation of an available part to a graphical representation of the unit of work done. In response, the embodiment updates the manufacturing process. Subsequently, the manufacturing process defined by the embodiment is expressed as the unit of work to be done on the first part and the available part.

FIG. 7 further illustrates that this embodiment of the present invention for defining a manufacturing process may be conceptualized as: i) given as initial data, a 3D graphical representation of a unit of work to be done and three-dimensional representation of parts and ii) in response to a user interaction with a three-dimensional representation of an available part, iii) generating as final data, a 3D graphical representation of the unit of work to be done as updated. The final data generated defines the manufacturing process.

In light of the foregoing, those skilled in the art will readily recognize that embodiments of the present invention also contemplate describing a work to be done in response to a user interacting with a three-dimensional representation of one or more parts in other ways. For example, an embodiment of the present invention, responsive to a user interacting with a three-dimensional representation of parts in a manner representative of "painting" the parts, describes a work to be done as painting the parts. For example, an embodiment of the present invention, responsive to a user interacting with a three-dimensional representation of more or parts in a manner representative of "welding" the parts, describes a work to be done as welding the parts. A user may interact with a three-dimensional representation of one or more parts in numerous ways and embodiments of the present invention describe a work to be done in response to the user interacting with the three-dimensional representation of the one or more parts in any one of those numerous ways.

Figure 8:
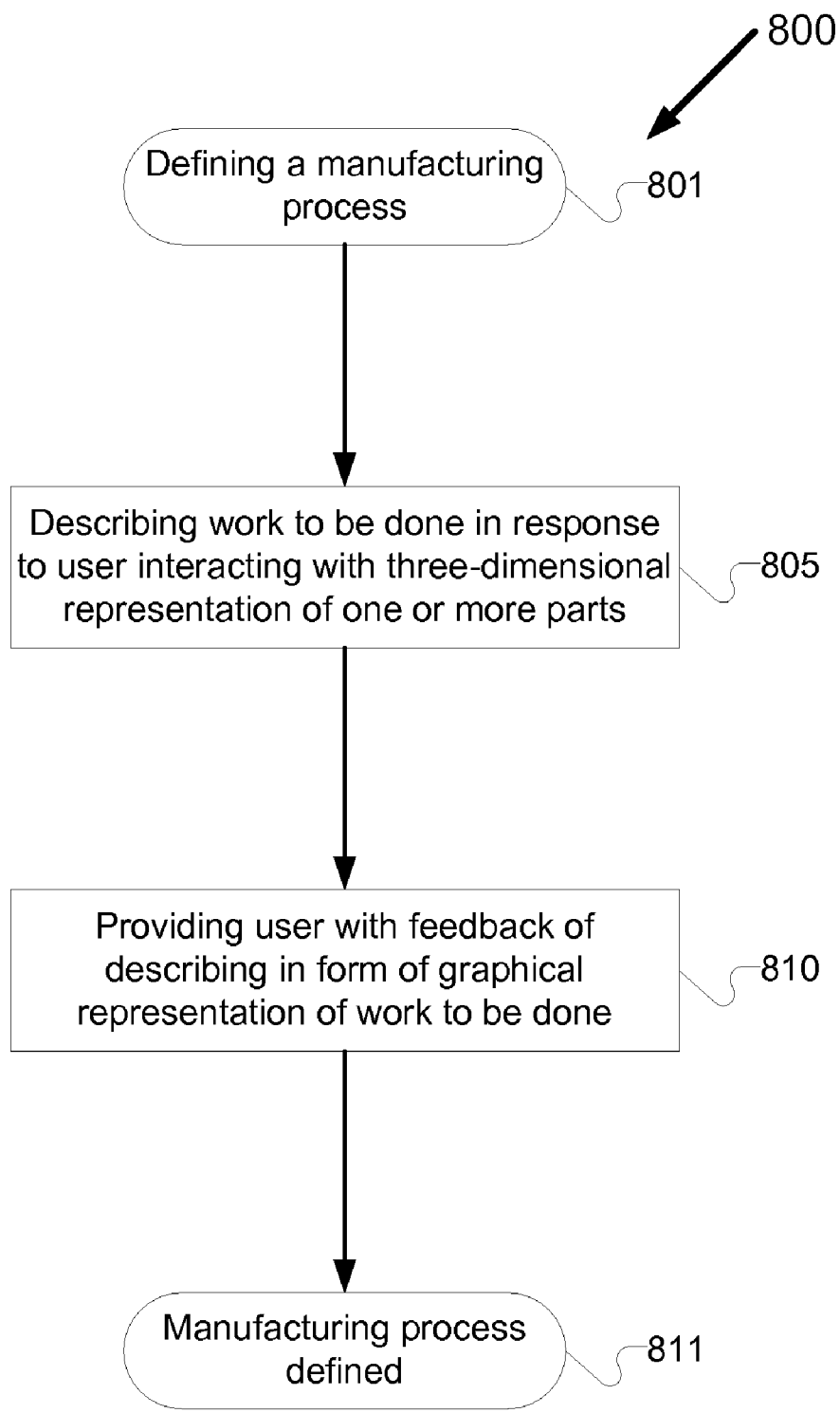
FIG. 8 is a flow chart of an example process for defining a manufacturing process, in accordance with an embodiment of the present invention.

FIG. 8 illustrates an example process 800 for defining a manufacturing process according to principles of the present invention. The process 800 starts (801). The process 800, given a manufactured product formed of one or more parts, for each user interaction, describes (805) a work to be done in response to a user interacting with a three-dimensional representation of the one or more parts. The process 800 provides (810) the user with feedback of the describing (805) in the form of a graphical representation of the work to be done. The manufacturing process is defined by the graphical representation (e.g., 3D image-based, or other 3D graphical representation) of the work to be done. The process 800 ends (811) with the manufacturing process defined.

Figure 9:
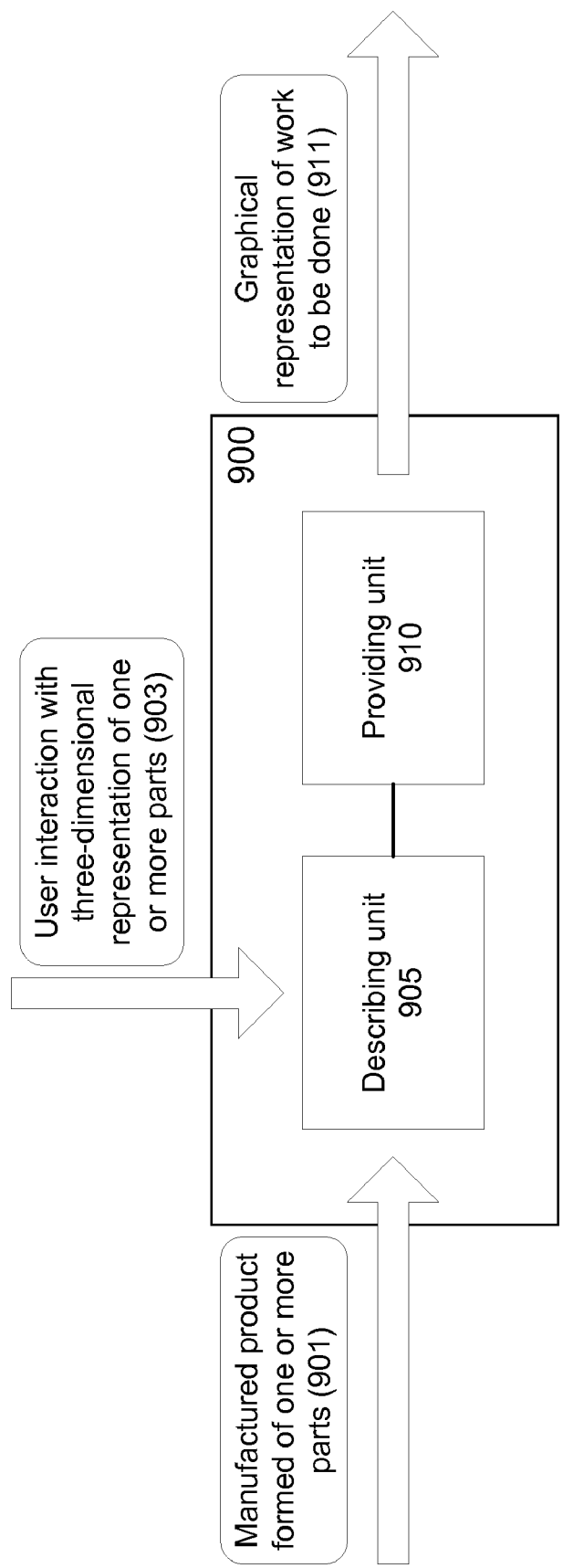
FIG. 9 is a block diagram of an example apparatus to define a manufacturing process, in accordance with an embodiment of the present invention.

FIG. 9 illustrates an example apparatus 900 of the present invention defining a manufacturing process. The apparatus 900 has a describing unit 905 and a providing unit 910 coupled to the describing unit 905. Given a manufactured product formed of one or more parts 901, for each user interaction 903, the describing unit 905 describes a work to be done in response to a user interacting with a three-dimensional representation of the one or more parts. The providing unit 910 provides the user with feedback of the describing in the form of a graphical representation (e.g., 3D image-based, or other 3D graphical representation) of the work to be done 911. The manufacturing process is defined by the graphical representation of the work to be done 911.

A three-dimensional representation of one or more parts that form a product may not be available for a user to interact with. For example, the parts are not yet represented or otherwise modeled in three dimensions. In an event, a three-dimensional representation of one or more parts is not available with which a user interacts, a convenient embodiment describes a work to be done in response to the user interacting with a text-based representation of the one or more parts.

In some instances, a three-dimensional representation represents some parts and a text-based representation represents other parts. Together the three-dimensional representation and text-based representation represent the parts that form a product. In such instances, the foregoing embodiment describes a work to be done in response to a user interacting with both the three-dimensional representation of the some parts and the text-based representation of the other parts.

In other instances, the foregoing embodiment describes a work to be done in response to a user interacting with a text-based representation of one or more parts initially. A three-dimensional representation of the one or more parts can then be associated with the work to be done described by the embodiment.

A convenient embodiment in addition to describing a work be done, in response to a user interacting with a graphical representation of the work to be done, also describes the work to be done as being done by a resource. A further convenient embodiment provides the user with feedback of: i) describing the work to be done and ii) describing the work to be done as being done by a resource in the form of the graphical representation, a first side of which represents in a graphical manner the work to be done and a second side of which represents in a graphical manner the resource to do the work to be done.

Figure 10:
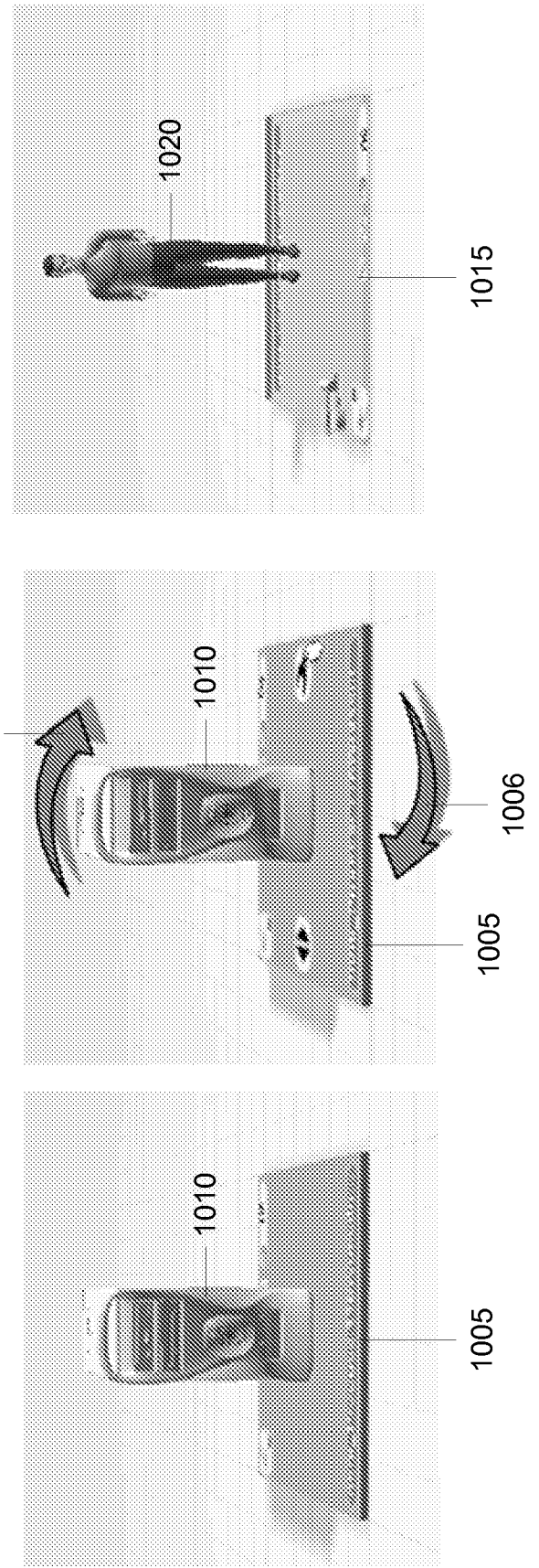
FIG. 10 is a series of screenshots of describe a work to be done being done by a resource, in accordance with an embodiment of the present invention.

For example, in FIG. 10, a first side of a graphical representation of a manufacturing process 1005 represents the manufacturing process and an "output" product of the manufacturing process 1010 in a graphical manner, e.g., as a three-dimensional representation of the product manufactured. That is, the first side 1005 represents a work to be done, the output or outcome of which is the product 1010 represented. In response to a user interacting (denoted by arrows 1006) with the first side of the graphical representation of the manufacturing process 1005, the first side 1005 is "flipped" to a second side of the graphical representation of the manufacturing process 1015. The second side 1015 represents a resource 1020 (e.g., a machine or human) implementing the manufacturing process in a graphical manner, e.g., as a three-dimensional representation of the resource. That is, the second side 1015 represents the work to be done being implemented or otherwise done by the resource 1020 represented.

Figure 11A:
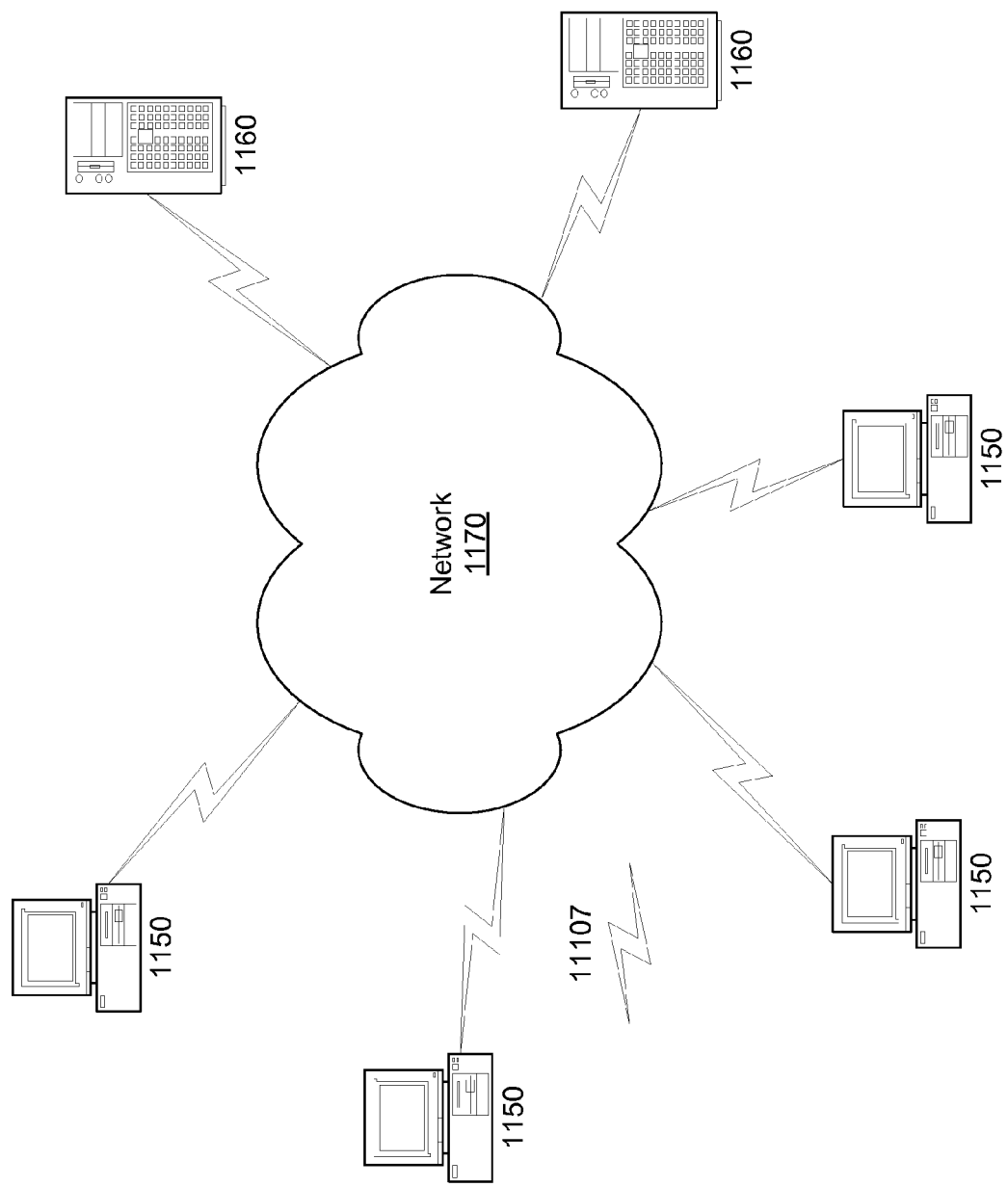
FIG. 11A is a block diagram of an example network in which embodiments of the present invention may be deployed.

FIG. 11A illustrates a computer network or similar digital processing environment in which embodiments of the present invention may be deployed. Client computer(s)/devices 1150 and server computer(s) 1160 provide processing, storage, and input/output devices executing application programs and the like. Client computer(s)/devices 1150 can also be linked through communications network 1170 to other computing devices, including other client devices/processes 1150 and server computer(s) 1160. Communications network 1170 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 11B:
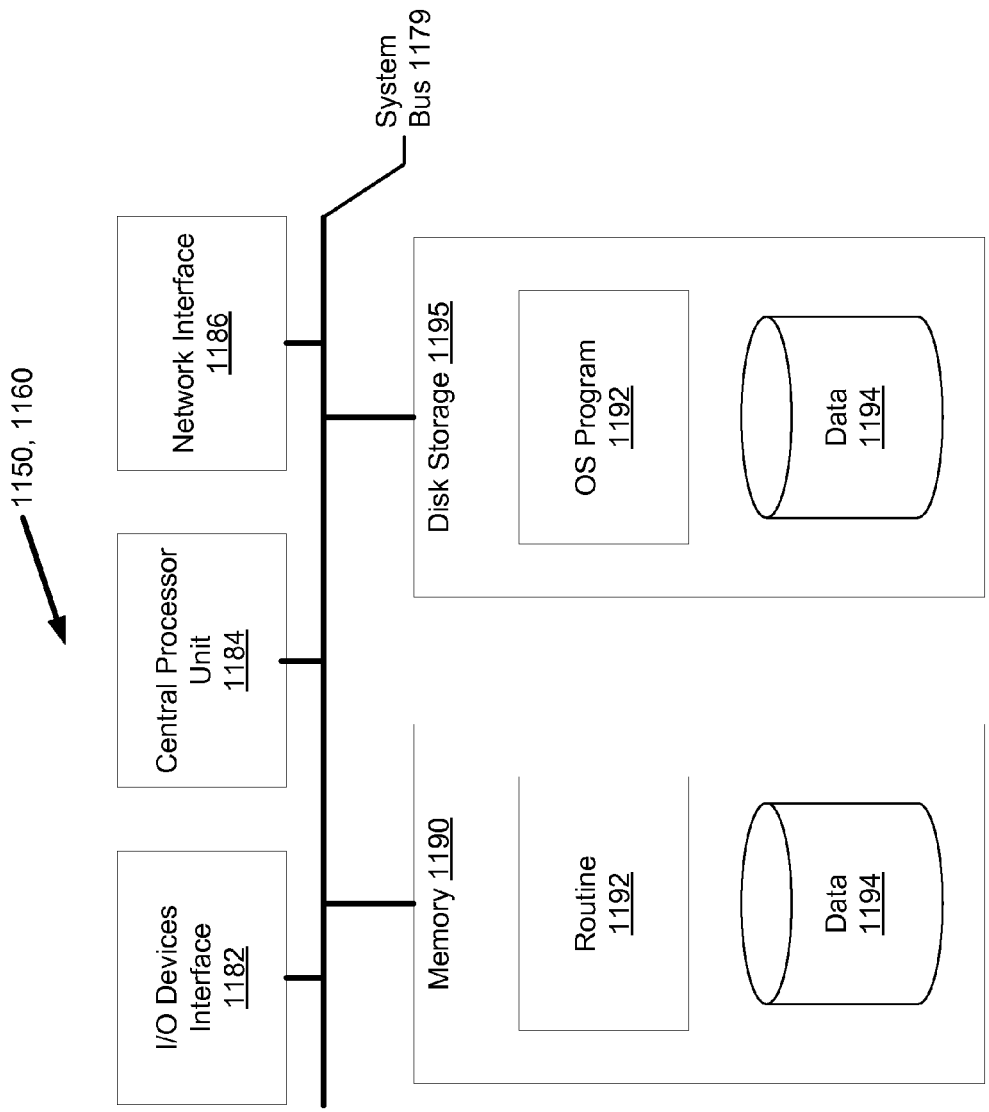
FIG. 11B is a block diagram of an example computer implementing embodiments of the present invention.

FIG. 11B is a block diagram of the internal structure of a computer (e.g., client processor/device 1150 or server computers 1160 of FIG. 11A) in which various embodiments of the present invention may be implemented. Each computer 1150, 1160 contains system bus 1179, where a bus is a set of hardware lines used for data transfer among the components of a computer or processing system. Bus 1179 is essentially a shared conduit that connects different elements of a computer system (e.g., processor, disk storage, memory, input/output ports, network ports, etc.) that enables the transfer of information between the elements. Attached to system bus 1179 is I/O device interface 1182 for connecting various input and output devices (e.g., keyboard, mouse, displays, printers, speakers, etc.) to the computer 1150, 1160. Network interface 1186 allows the computer to connect to various other devices attached to a network (e.g., network 1170 of FIG. 11A). Memory 1190 provides volatile storage for computer software instructions 1192 and data 1194 used to implement an embodiment of the present invention. Disk storage 1195 provides non-volatile storage for computer software instructions 1192 and data 1194 used to implement an embodiment of the present invention. Central processor unit 1184 is also attached to system bus 1179 and provides for the execution of computer instructions.

In one embodiment, the processor routines 1192 and data 1194 are a computer program product (generally referenced 1192), including a computer readable medium (e.g., a removable storage medium such as one or more DVD-ROM's, CD-ROM's, diskettes, tapes, etc.) that provides at least a portion of the software instructions for the invention system. Computer program product 1192 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 11107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 11192.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 1192 is a propagation medium that the computer system 1150 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

Further, the present invention may be implemented in a variety of computer architectures. The computer of FIGS. 11A and 11B are for purposes of illustration and not limitation of the present invention.

While this invention has been particularly shown and described with references to example embodiments thereof, it will be understood by those skilled in the art that various changes in form and details may be made therein without departing from the scope of the invention encompassed by the appended claims.

It should be understood that the block and flow diagrams may include more or fewer elements, be arranged differently, or be represented differently. It should be understood that implementation may dictate the block and flow diagrams and the number of block and flow diagrams illustrating the execution of embodiments of the present invention.

It should be understood that elements of the block and flow diagrams described above may be implemented in software, hardware, or firmware. In addition, the elements of the block and flow diagrams described above may be combined or divided in any manner in software, hardware, or firmware. If implemented in software, the software may be written in any language that can support the embodiments disclosed herein. The software may be stored on any form of computer readable medium, such as random access memory (RAM), read only memory (ROM), compact disk read only memory (CD-ROM), and so forth. In operation, a general purpose or application specific processor loads and executes the software in a manner well understood in the art.

What is claimed is:

1. A computer implemented method for defining a manufacturing process, the computer implemented method comprising:
in a processor:
given a manufactured product formed of one or more parts, for each user interaction, describing a work to be done in response to a user graphically interacting with a three-dimensional representation of the one or more parts;
providing the user with feedback of the describing in the form of a graphical representation of the work to be done, the manufacturing process being defined by the graphical representation of the work to be done; wherein the describing includes: given a first manufacturing process that describes a first unit of work to be done on a first set of work inputs that includes a first part, second part, and third part of the manufactured product;
in response to the user moving the three-dimensional representations of the first part and the second part from a graphical representation of the first unit of work to be done;
decomposing the first manufacturing process into a second manufacturing process that describes a second unit of work to be done on a second set of work inputs that includes the first part and the second part, the three-dimensional representations of which the user moved; and
updating the first manufacturing process to describe the first unit of work to be done on the first set of work inputs that includes a work output of the second manufacturing process and the third part.

2. The method of claim 1 wherein the describing includes:
instead of the first manufacturing process and decomposing the first manufacturing process into the second manufacturing process in response to the user moving the three-dimensional representations of the first part and the second part, given a manufacturing process that describes a unit of work to be done on a set of work inputs that includes a certain first part, certain second part, and certain third part of the manufactured product;
in response to the user deleting a three-dimensional representation of the certain third part from a graphical representation of the unit of work to be done; updating the manufacturing process to describe the unit of work to be done on the set of work inputs that includes the certain first part, the certain second part, and not the certain third part, the three-dimensional representation of which the user deleted.

3. The method of claim 1 wherein the describing includes:
instead of the first manufacturing process and decomposing the first manufacturing process into the second manufacturing process in response to the user moving the three-dimensional representation of the second part, given one manufacturing process that describes one unit of work to be done on a certain first set of work inputs that includes a certain first part and certain second part of the manufactured product;
given another manufacturing process that describes another unit of work to be done on another set of work inputs that includes a another third part of the manufactured product;
in response to the user moving a three-dimensional representation of the certain second part from a graphical representation of the one manufacturing process to a graphical representation of the other manufacturing process;
updating the one manufacturing process to describe the one unit of work to be done on the one set of work inputs that includes the certain first part and not the certain second part; and
updating the other manufacturing process to describe the other unit of work to be done on the other set of work inputs including the certain second part, the three-dimensional representation of which the user moved, and the certain third part.

4. The method of claim 1 wherein the describing includes:
instead of the first manufacturing process and decomposing the first manufacturing process into the second manufacturing process in response to the user moving the three-dimensional representations of the first part and the second part, given a manufacturing process that describes a unit of work to be done on a set work inputs that includes a certain first part of the manufactured product;
in response to the user moving a three-dimensional representation of an available part to a graphical representation of the manufacturing process;
updating the manufacturing process to describe the unit of work to be done on the set of work inputs that includes the certain first part and the available part, the three-dimensional representation of which the user moved.

5. The method of claim 1 wherein the describing includes:
instead of the first manufacturing process and decomposing the first manufacturing process into the second manufacturing process in response to the user moving the three-dimensional representations of the first part and the second part, given a manufacturing process that does not describe a unit of work to be done;
in response to the user moving the three-dimensional representations of a certain first part and certain second part to a graphical representation of the manufacturing process;
updating the manufacturing process to describe the unit of work to be done on the certain first part and certain second part, the three-dimensional representations of which the user moved.

6. The method of claim 1 wherein the describing includes, in an event, the three-dimensional representation of the one or more parts is not available with which the user graphically interacts, describing the work to be done in response to the user interacting with a text-based representation of the one or more parts.

7. The method of claim 1 further comprising in response to the user graphically interacting with the graphical representation of the work to be done, describing the work to be done as being done by a resource.

8. The method of claim 7 wherein the providing includes providing the user with feedback of the describings in the form of the graphical representation, a first side of which represents in a graphical manner the work to be done and a second side of which represents in a graphical manner the resource to do the work to be done.

9. An apparatus to define a manufacturing process, the apparatus comprising:
given a manufactured product formed of one or more parts, for each user interaction, a describing unit to describe a work to be done in response to a user graphically interacting with a the three-dimensional representation of the one or more parts;
providing unit coupled to the describing unit to provide the user with feedback of the describing in the form of a graphical representation of the work to be done, the manufacturing process being defined by the graphical representation of the work to be done;
an interface coupled to the providing unit for outputting the graphical representation of the work to be done to a display viewable by the user;
wherein the describing unit includes:
given a first manufacturing process that describes a first unit of work to be done on a first set of work inputs that includes a first part, second part, and third part of the manufactured product;
in response to the user moving the three-dimensional representations of the first part and the second part from a graphical representation of the first unit of work to be done;
a decomposing unit to decompose the first manufacturing process into a second manufacturing process that describes a second unit of work to be done on a second set of work inputs that includes the first part and the second part, the three-dimensional representations of which the user moved; and
an updating unit coupled to the decomposing unit to update the first manufacturing process to describe the first unit of work to be done on the first set of work inputs that includes a work output of the second manufacturing process and the third part.

10. The apparatus of claim 9 wherein the describing unit includes:
instead of the first manufacturing process and the decomposing unit to decompose the first manufacturing process into the second manufacturing process in response to the user moving the three-dimensional representations of the first part and the second part, given a manufacturing process that describes a unit of work to be done on a set of work inputs that includes a certain first part, certain second part, and certain third part of the manufactured product;
in response to the user deleting a three-dimensional representation of the certain third part from a graphical representation of the unit of work to be done;
a subject updating unit to update the manufacturing process to describe the unit of work to be done on the set of work inputs that includes the certain first part, the certain second part, and not the certain third part, the three-dimensional representation of which the user deleted.

11. The apparatus of claim 9 wherein the describing unit includes:
- instead of the first manufacturing process and the decomposing unit to decompose the first manufacturing process into the second manufacturing process in response to the user moving the three-dimensional representation of the second part, given one manufacturing process that describes one unit of work to be done on a certain first set of work inputs that includes a certain first part and certain second part of the manufactured product;
- given another manufacturing process that describes another unit of work to be done on another set of work inputs that includes a certain third part of the manufactured product;
- in response to the user moving a three-dimensional representation of the certain second part from a graphical representation of the one manufacturing process to a graphical representation of the other manufacturing process;
- a subject updating unit to update the one manufacturing process to describe the one unit of work to be done on the one set of work inputs that includes the certain first part and not the certain second part, and to update the other manufacturing process to describe the other unit of work to be done on the other set of work inputs including the certain second part, the three-dimensional representation of which the user moved, and the certain third part.

12. The apparatus of claim 9 wherein the describing unit includes:
- instead of the first manufacturing process and the decomposing unit to decompose the first manufacturing process into the second manufacturing process in response to the user moving the three-dimensional representations of the first part and the second part, given a manufacturing process that describes a unit of work to be done on a set work inputs that includes a certain first part of the manufactured product;
- in response to the user moving a three-dimensional representation of an available part to a graphical representation of the manufacturing process;
- a subject updating unit to update the manufacturing process to describe the unit of work to be done on the set of work inputs that includes the certain first part and the available part, the three-dimensional representation of which the user moved.

13. The apparatus of claim 9 wherein the describing unit includes:
- instead of the first manufacturing process and the decomposing unit to decompose the first manufacturing process into the second manufacturing process in response to the user moving the three-dimensional representation of the first part and the second part, given a manufacturing process that does not describe a unit of work to be done;
- in response to the user moving the three-dimensional representations of a certain first part and certain second part to a graphical representation of the manufacturing process;
- a subject updating unit to update the manufacturing process to describe the unit of work to be done on the certain first part and certain second part, the three-dimensional representations of which the user moved.

14. The apparatus of claim 9 wherein the describing unit includes, in an event, the three-dimensional representation of the one or more parts is not available with which the user graphically interacts, a text-based describing unit to describe the work to be done in response to the user interacting with a text-based representation of the one or more parts.

15. The apparatus of claim 9 further comprising in response to the user graphically interacting with the graphical representation of the work to be done, a resource describing unit to describe the work to be done as being done by a resource.

16. The apparatus of claim 15 wherein the providing unit includes a providing unit to provide the user with feedback of the describings in the form of the graphical representation, a first side of which represents in a graphical manner the work to be done and a second side of which represents in a graphical manner the resource to do the work to be done.

17. A computer program product comprising a non-transitory computer readable medium having a computer readable program, wherein the computer readable program when executed on a computer causes the computer to:
- given a manufactured product formed of one or more parts, for each user interaction, describe a work to be done in response to a user graphically interacting with a three-dimensional representation of the one or more parts;
- provide the user with feedback of the describing in the form of a graphical representation of the work to be done, the manufacturing process being defined by the graphical representation of the work to be done;
- wherein the computer readable program when executed on the computer further causes the computer to:
  - given a first manufacturing process that describes a first unit of work to be done on a first set of work inputs that includes parts of the manufactured product;
  - in response to the user moving the three-dimensional representations of a subset of the parts from a graphical representation of the first unit of work to be done;
  - decompose the first manufacturing process into a second manufacturing process that describes a second unit of work to be done on a second set of work inputs that includes the subset of the parts, the three-dimensional representations of which the user moved; and
  - update the first manufacturing process to describe the first unit of work to be done on the first set of work inputs that includes a work output of the second manufacturing process and a remainder of the parts.

* * * * *

UNITED STATES PATENT AND TRADEMARK OFFICE
CERTIFICATE OF CORRECTION

PATENT NO. : 8,095,229 B2  
APPLICATION NO. : 12/330261  
DATED : January 10, 2012  
INVENTOR(S) : Marino Muser et al.

Page 1 of 1

It is certified that error appears in the above-identified patent and that said Letters Patent is hereby corrected as shown below:

In Claim 3, Column 13:  
Line 17, after includes a, delete "another" and insert --certain--

In Claim 9, Column 14:  
Line 19, after with a, delete "the"

In Claim 13, Column 15:  
Line 52, after three-dimensional, delete "representation" and insert --representations--

Signed and Sealed this  
Tenth Day of April, 2012

David J. Kappos  
*Director of the United States Patent and Trademark Office*